No. 719,168. PATENTED JAN. 27, 1903.
W. T. WRIGHT.
BAND CUTTER AND FEEDER FOR THRESHING MACHINES.
APPLICATION FILED NOV. 27, 1901.
NO MODEL.
2 SHEETS—SHEET 1.
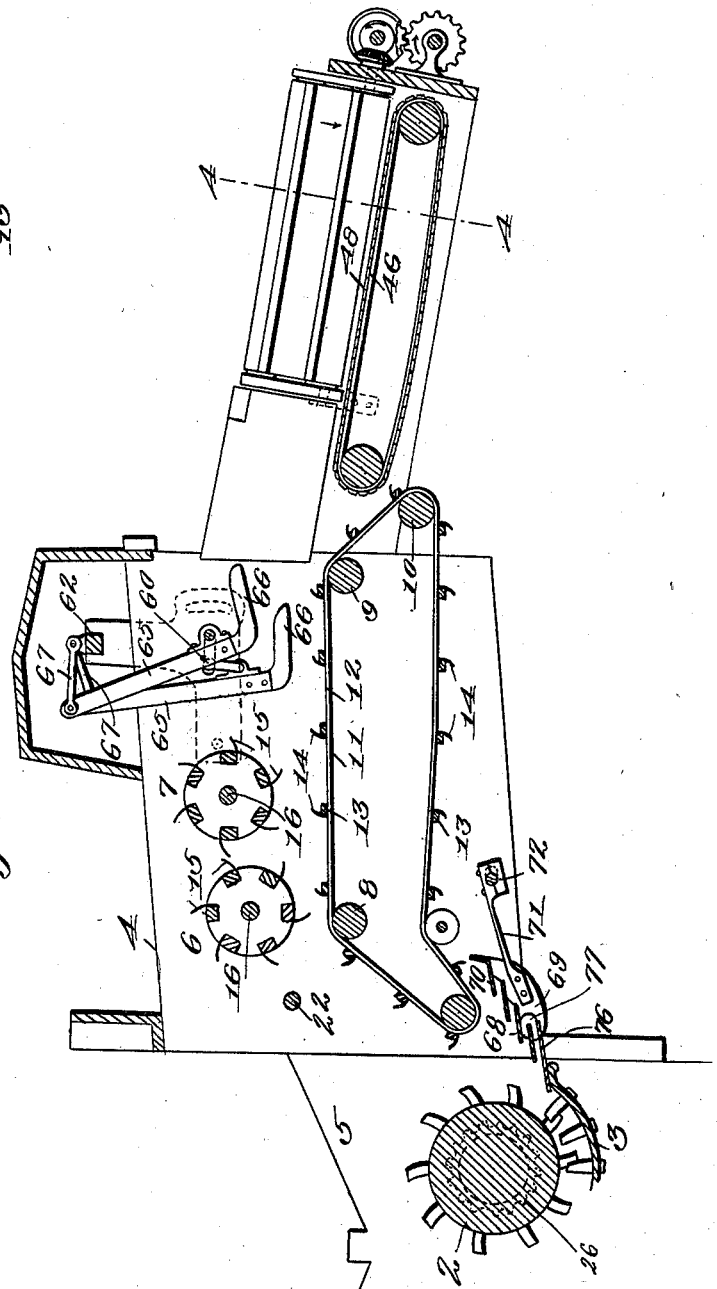
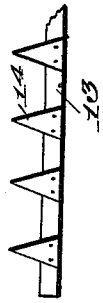
Witnesses:
Inventor
Wallace T. Wright
By James L. Norris
Atty No. 719,168. PATENTED JAN. 27, 1903.
W. T. WRIGHT.
BAND CUTTER AND FEEDER FOR THRESHING MACHINES.
APPLICATION FILED NOV. 27, 1901.
NO MODEL. 2 SHEETS—SHEET 2.

Witnesses:
Inventor
Wallace T. Wright.
By James L. Norris.
Atty

UNITED STATES PATENT OFFICE.

WALLACE T. WRIGHT, OF URSA, ILLINOIS.

BAND-CUTTER AND FEEDER FOR THRESHING-MACHINES.

SPECIFICATION forming part of Letters Patent No. 719,168, dated January 27, 1903.

Application filed November 27, 1901. Serial No. 83,939. (No model.)

*To all whom it may concern:*

Be it known that I, WALLACE T. WRIGHT, a citizen of the United States, residing at Ursa, in the county of Adams and State of Illinois, have invented new and useful Improvements in Band-Cutters and Feeders for Threshing-Machines, of which the following is a specification.

This invention relates to band-cutters and feeders for threshing-machines; and the objects and advantages thereof will be set forth in the following description, while the novelty thereof will form the basis of the claims appended to said description, and in some respects the present invention is in the nature of an improvement upon that disclosed by Letters Patent No. 532,623, granted to me on January 15, 1895, and to which reference may be had.

The several features of the present improvements are illustrated in simple and convenient forms thereof in the accompanying drawings, forming a part of this specification, and in which—

Figure 2:
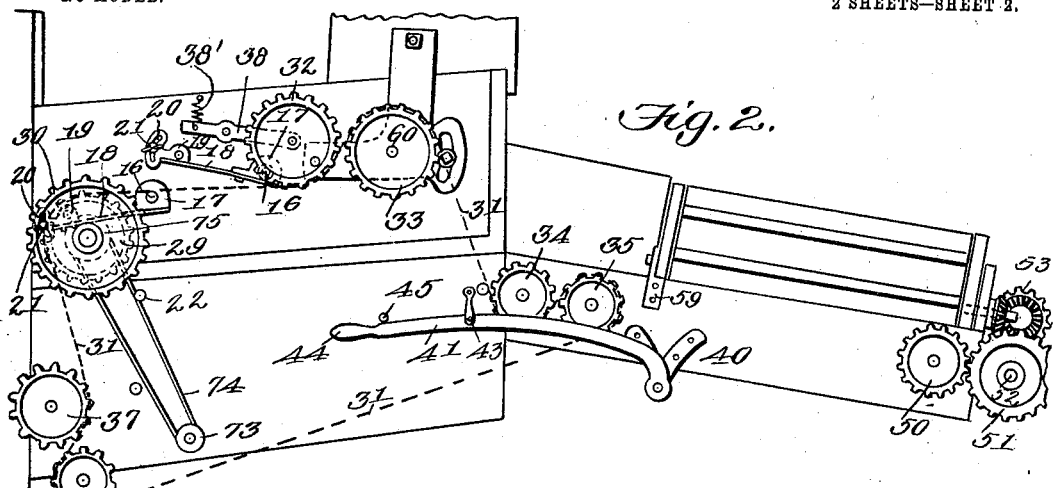
Figure 3:
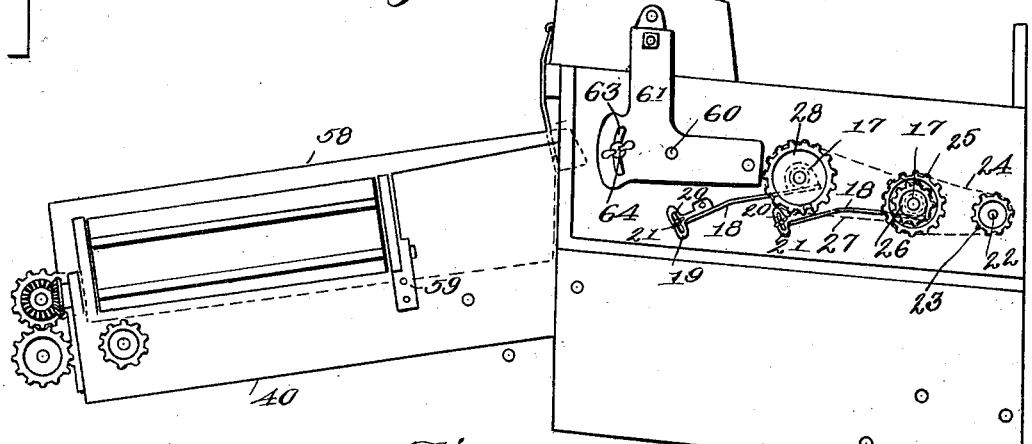
Figure 4:
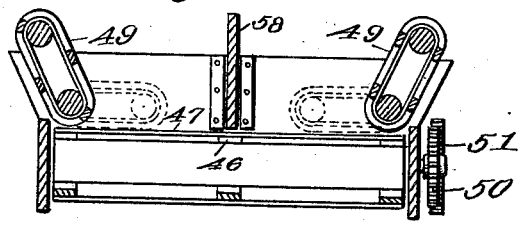
Figure 5:
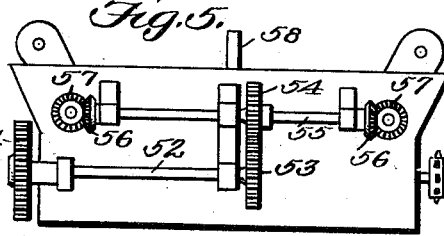

Figure 1 is a central longitudinal section of the apparatus. Fig. 2 is a side elevation. Fig. 3 is a similar view taken from the opposite side. Fig. 4 is a transverse section in the line 4 4, Fig. 1. Fig. 5 is an end elevation. Fig. 6 is a detail of a cross-bar and the teeth carried thereby.

Like characters refer to like parts throughout the several views.

In the drawings I have shown at 2 the cylinder of a threshing-machine of ordinary construction, the coöperating concave being denoted by 3.

A frame, as 4, extends forwardly from the casing 5, inclosing the cylinder 2, and which is substantially of box-like form to inclose a plurality of rake-cylinders, as 6 and 7. I have only shown two of such cylinders; but it will be obvious that one or more can be employed, and in front of said rake-cylinders the band-cutting mechanism is arranged, and the same will be hereinafter described.

The frame 4 carries under the rotary rake-cylinders 6 and 7 a series of rollers, as 8, 9, and 10, which are mounted in a manner like the rollers 12, 13, and 14 shown by the drawings of the patent heretofore issued to me, and these rollers support the endless traveling carrier 11, which serves as the bottom of the frame 4 and which constitutes a movable bed under the rake-cylinders 6 and 7, the carrier being so actuated that its upper run and said cylinders coact to supply the cut bundles to the threshing mechanism. This traveling carrier may be, if desired, mounted so as to drop down in the manner disclosed by said patent, although it is not so illustrated herein, and is preferably of the same construction as the carrier shown by said patent—that is, it consists of a plurality of belts 12, to which are attached cross-bars 13, having teeth, as 14, of approximately V or saw shape, so that the traveling carrier presents a roughened surface to positively advance the material.

The rake-cylinders 6 and 7 are of skeleton form, their cross-bars having teeth, as 15, like the teeth 14, to which I have just alluded, except that the teeth 14 are smaller than the teeth 15, and the same applies to the respective cross-bars. Said teeth are flat and have their points bent back slightly and wide at their inner ends to prevent clinging to the grain and winding.

The shafts 16 of the rake-cylinders extend through slots in the side wall of the frame 4 and are carried by boxes, as 17. Said boxes are secured to spring-arms, as 18, on the opposite sides of the frame, and said arms have at their other extremities the plates 19, pivoted to said sides and having segmental slots, as 20, to receive thumb-screws, as 21, by which the angular positions of the several arms can be readily adjusted. From this it will be apparent that the rake-cylinders are yieldingly mounted, so that said cylinders can rise and fall automatically, due to the passing thereunder of material of variable height.

The main shaft of the apparatus is designated by 22, and it extends entirely across and beyond the frame 4, and the rake-cylinders can be driven by suitable connections from said main shaft. I have shown sprocket-gearing for the purpose, and said main shaft 22 is shown as having at one end a sprocket-wheel 23, connected by the sprocket-chain 24 with the sprocket-wheel 25 on the shaft of the rear cylinder 6, said last-mentioned shaft having the sprocket-wheel 26, connected by the sprocket-chain 27 with the sprocket-wheel 28 on the shaft of the forward cylinder 7, and the mechanism will be so proportioned that the cylinders 6 and 7 will be driven at differential speeds, or through suitable means (not shown) they may be thrown out of action.

The main shaft 22 carries at the end opposite that carrying the sprocket-wheel 23 the sprocket-wheel 29 and a wheel 30, which may be driven from a suitable motor, said sprocket-wheel 29 being adapted to receive the sprocket-chain 31, which travels in contact with the idler sprocket-wheel 32, near the upper side of the frame 4, then in contact with a sprocket-wheel 33, then downward against an idler sprocket-wheel 34, then upon a sprocket-wheel 35, then rearwardly to the idler sprocket-wheel 36, and finally upon the sprocket-wheel 37 at the rear lower side of the frame. The sprocket-wheel 37 is connected with the endless traveling carrier 11, whereby the same can be driven. The idler sprocket-wheel 32 is carried by a pivoted arm 38, to which a coiled spring 38' is connected, whereby the slack in the driving-chain is properly taken up.

Sometimes it is not always convenient, owing to the position of the apparatus, to drive the main shaft 22 in the same direction. To insure, however, the proper travel of the carrier 11, the position of the chain belt 24 can be readily and quickly changed to secure the necessary result.

The carrier 11 is so operated that it is driven at a relatively low rate of speed and slower than a second carrier hereinafter described.

The idler sprocket-wheel 34 and sprocket-wheel 35 are carried by an auxiliary or tender frame 40. The auxiliary frame 40 abuts against the main frame 4, and a lever, as 41, is pivoted to a bracket, as 42, on the under side of the auxiliary frame near the main frame, said lever being fulcrumed, as at 43, to the main frame 4 and having a handle 44, by which said lever can be manipulated. The rear arm of the lever is adapted to engage under a pin or stop, as 45, on the main frame 4 to hold the auxiliary frame in a horizontal position. By disengaging the lever 41 from the pin 45 it can be swung around, so as to first swing the tender-frame downwardly and then under the main frame when it is desired to store the apparatus.

The auxiliary frame 40 is provided with an endless carrier 46, including, like the main carrier 11, a series of belts 47, connected by the transverse bars or slats 48, which are covered by an endless web of canvas or similar material having a smooth surface. The shafts of the rolls of this auxiliary endless carrier 46 are suitably supported by the frame 40, and the shaft of the forward roll carries the sprocket-wheel 35, to which I have previously referred, and the operating mechanism is so timed that the forward or auxiliary feeder or carrier will be driven faster than the rear or main one.

The sides of the compartments of the auxiliary or tender frame consist of endless belts, as 49, arranged normally in an upright position, and the shafts of the rolls of said belts are suitably carried by the auxiliary frame 40.

The forward shaft of the auxiliary carrier 46 has a gear-wheel 50, meshing with a corresponding gear 51 on the outer end of the shaft 52, extending partially across the front end of the apparatus and having at its inner end a gear 53, meshing with the gear 54 on the transverse shaft 55, having at its opposite ends bevel-gears, as 56, meshing with similar bevel-gears 57 on the lower shafts of the belts 49, the mechanism serving to drive the inner or working runs of said belts downwardly.

The tender-frame is divided interiorly into equal-sized compartments by the wall 58, running longitudinally thereof and into each of which the sheaves of grain can be pitched to be conveyed by the auxiliary and smooth-surfaced feeder 46 to the main and rough-surfaced feeder or carrier 11. By causing the main feeder to travel slowly and the auxiliary feeder to travel faster the straw and grain are kept out of the way of the pitchers and the latter will not throw one bundle on top of another. This also bunches the grain and leaves no gap between the same. As soon as a bundle is thrown onto the auxiliary carrier it is conducted rapidly toward the main feeder, which takes it and causes it to travel slowly toward the threshing mechanism, and as the auxiliary carrier has a smooth surface it slips under any bundles at the junction of the two carriers and brings up another bundle, so as to quickly close up the gap, whereby a proper feed to the threshing mechanism is assured regardless of any irregular pitching of the bundles onto the smooth-surfaced carrier.

The main shaft 22 may be driven in any suitable manner, and variations in speed of the parts driven therefrom can be secured by changing the size of the sprocket-wheel 23 thereon.

The side belts or feeders 49 do not carry the material, but force onto the auxiliary feeder 46 all loose grain and straighten out bundles that are pitched in crosswise, and it will be seen that the lower ends of the side belts or feeders 49 are in contact with or substantially in contact with the upper surface of said auxiliary feeder 46, so as not only to secure the result hereinbefore set forth, but to prevent grain or the like from working sidewise between said side belts 49 and the auxiliary feeder 46.

The sides of the tender-frame carry overhanging brackets, as 59, to receive the bearings that carry the inner ends of the rollers of the side belts or feeders 49, the brackets slipping over the ends of the said boxes, so that the said belts 49 can be folded inwardly when moving the apparatus from place to place. The outer bearings are pivoted in the end of the auxiliary frame.

The sprocket-wheel 33 is secured to one end of the transverse crank-shaft 60, said shaft being let into slots in the sides of the main frame 4 and being sustained by angular brackets, as 61, pivoted on the opposite sides of said frame 4. The upright arms of these brackets are connected by the cross-bar 62, while the forward arms thereof have segmental slots 63 to receive the holding-screws 64, connected to the sides of the frame 4 and by which said brackets, and hence the band-cutting mechanism which is connected therewith, can be freely adjusted.

The crank-shaft 60 is of the four-way kind, its respective crank portions passing through bearings of suitable kind on the handles 65 of the knives 66, the knives and their handles presenting substantially L-shaped structures, and the handles are substantially vertical, so that the knives make a long stroke while down on the grain, but cannot be raised so high as to permit two superimposed bundles to pass thereby, the upper bundle or bundles being held back by said knives.

By using a four-way crank-shaft only one knife is down at a time. The knives have straight edges, with fine file-cut teeth projecting forward and file-cut on one side. The upper ends of the handles 65 have links, as 67, pivoted thereto and also to the cross-bar 62.

As the carriers 11 and 46 advance the bundles the latter conducts them under the knives 66, which as they reciprocate sever the bands, and the carrier 11 and rake-cylinders 6 and 7 conjointly feed the loosened grain to the threshing mechanism.

I arrange under the inclined discharge end of the carrier 11 an agitator, as 68, adapted normally to bridge the space between said discharge end and the concave 3. The vibrator includes a body or frame, as 69, to the upper side of which are secured the overlapping plates 70, disposed at slight angles to check the blast of the cylinder, and to the body the arm 71 is affixed, said arm projecting forwardly therefrom and having a suitable bearing to receive the cranked portion of the crank-shaft 72, carrying a pulley, as 73, connected by belt 74 with the pulley 75 on the main shaft 22.

A plate, as 76, has a grooved portion, as 77, adapted to slip over the rear plate of the vibrator, and the rear end of said plate is adapted to bear normally upon the concave 3. The vibrator as it is reciprocated deposits the shattered grain and loose chaff into cylinder-casing 5, and by slipping off the plate 76 the vibrator may be dropped down to provide ready access to the concave 3.

The main frame 4 may be bolted or otherwise fastened to a separator, and the structure can be strengthened by truss-rods, as 78.

While the teeth of the rake-cylinders 6 and 7 pull one way on or in the upper portion of the grain, the slowly-traveling toothed carrier 11 pulls the other way on the under side of the material, and thus the mass of material is thoroughly loosened or separated and spread apart. Therefore the grain passes to the thresher in a continuous stream throughout the full width of the machine and without any tendency to bunch up between the cylinders. The action of the revolving rake-cylinders is smooth and regular and with no dashing of the cylinder-bars against the grain, for the less the grain is pressed the more easily it may be separated. The retarding action of the slowly-moving toothed carrier in connection with the series of revolving rakes running successively at increased speeds is especially useful in the handling of grain that is stacked and hard to separate, and in this respect the operation of the present machine resembles that described by my prior patent.

Having described the invention, what I claim is—

1. In a band-cutter and feeder, a traveling carrier adapted to move at a relatively slow speed, a second traveling carrier adapted to move at a faster speed and to deliver material onto the first carrier, a pair of non-carrying belts mounted at the opposite sides of the second carrier and disposed normally in an upright position and the inner runs of said belts being arranged to travel downwardly and the lower ends of said non-carrying belts being substantially in contact with the upper surface of the second carrier and band-cutting mechanism coöperative with the first carrier.

2. In a band-cutter and feeder, a traveling carrier having a roughened surface, a second carrier, having a smooth surface, a pair of non-carrying belts mounted at the opposite sides of said second carrier and disposed normally in an upright position and the inner runs of said belts being arranged to travel downwardly and said feed-belts being foldable downward and the lower ends of said non-carrying belts being substantially in contact with the upper surface of said second carrier onto the second belt, and band-cutting mechanism coöperative with the first carrier.

3. In a band-cutter and feeder, a main traveling carrier, an auxiliary traveling carrier arranged to deliver material onto the main traveling carrier, a crank-shaft, and the framework being slotted to receive said crank-shaft, a plurality of knives having upright handles provided with bearings to receive the cranks of said shaft, a cross-bar, links connected with the upper ends of said handles and with said cross-bar, angular brackets pivoted upon the opposite sides of the framework, said brackets carrying said crank-shaft and being also connected with said cross-bar, and the brackets also having slots, and holding-screws passing through said slots and connected to the framework.

4. In a band-cutter and feeder, a primary traveling carrier, a secondary traveling carrier arranged to deliver material onto the primary carrier, a pair of non-carrying belts mounted at opposite sides of the secondary carrier and disposed normally in an upright position and the inner runs of said belts being arranged to travel downwardly and serving to force onto said secondary carrier the loose grain and to straighten out bundles that are pitched crosswise onto said secondary carrier and the lower ends of said non-carrying belts being substantially in contact with the upper surface of said secondary carrier, and band-cutting mechanism arranged to receive the material from the primary carrier.

5. In a band-cutter and feeder, a plurality of traveling carriers one of which is arranged to deliver material onto the other, a concave and a threshing-cylinder, a vibrator having a plurality of fixed and separated plates arranged one above the other and successively overlapping each other, a plate having a grooved portion adapted to slip over the lowermost plate of the vibrator and to be slidably supported by the concave, and means for operating said vibrator.

6. In a band-cutter and feeder, a main and an auxiliary traveling carrier the auxiliary carrier being arranged to deliver material onto the main carrier and having a smooth surface and the main carrier having a rough face, a pair of non-carrying belts arranged normally in an upright position at opposite sides of the auxiliary carrier, and the lower ends of said non-carrying belts being substantially in contact with said auxiliary carrier and a plurality of rotary rake-cylinders arranged above the main carrier, and band-cutting mechanism.

7. In a band-cutter and feeder, a main and an auxiliary traveling carrier the auxiliary carrier being arranged to deliver material onto the main carrier and having a smooth surface and the main carrier having a rough face, a pair of feed-belts arranged in an upright position at opposite sides of the auxiliary carrier, and a plurality of rotary rake-cylinders arranged above the main carrier, band-cutting mechanism, and a series of spring-arms having bearings for supporting the opposite ends of the shafts of said rake-cylinders.

In testimony whereof I have hereunto set my hand in presence of two subscribing witnesses.

WALLACE T. WRIGHT.

Witnesses:
CHAS. H. HENDERSON,
FRED C. TURNER.